United States Patent [19]

Chauffoureaux

[11] 4,003,554

[45] Jan. 18, 1977

[54] EQUIPMENT FOR HEATING POLAR POLYMERS TO THE TEMPERATURE AT WHICH THEY BECOME PLASTIC

[75] Inventor: Jean Chauffoureaux, Bierges, Belgium

[73] Assignee: Solvay & Cie, Brussels, Belgium

[22] Filed: Feb. 12, 1975

[21] Appl. No.: 549,209

[30] Foreign Application Priority Data

Mar. 4, 1974 Luxembourg .......................... 69549

[52] U.S. Cl. ........................ 259/4 AC; 259/DIG. 18; 219/10.55 A
[51] Int. Cl.² ..................... B01F 15/00; H05B 9/06
[58] Field of Search ............. 259/4, 191, DIG. 18; 219/10.55 R, 10.55 A, 10.55 D, 10.55 F; 333/21 A; 425/206

[56] References Cited

UNITED STATES PATENTS

| 2,537,182 | 1/1951 | Bertrand | 219/10.55 R X |
|---|---|---|---|
| 2,537,193 | 1/1951 | Shaw | 219/10.55 A X |
| 2,669,750 | 2/1954 | Keeney | 425/206 X |
| 2,943,175 | 6/1960 | Guanella | 219/10.55 F |
| 3,529,115 | 9/1970 | Jawor | 219/10.55 A |
| 3,549,848 | 12/1970 | Williams | 219/10.55 A |
| 3,733,607 | 5/1973 | Bobrow et al. | 333/21 A X |
| 3,777,095 | 12/1973 | Muranaka | 219/10.55 A |
| 3,800,985 | 4/1974 | Grout et al. | 259/4 AB X |
| 3,851,863 | 12/1974 | Wallis | 259/4 AB X |

Primary Examiner—Harvey C. Hornsby
Assistant Examiner—Robert Pous
Attorney, Agent, or Firm—Spencer & Kaye

[57] ABSTRACT

Equipment for heating polar polymers to the temperature at which they become plastic comprises a microwave generator, a tubular component acting as a waveguide in conjunction with the generator, means for supplying the tubular component with the polar polymer and for causing the latter to travel through the tubular component and at least one static malaxating device positioned inside the tubular component.

13 Claims, 2 Drawing Figures

EQUIPMENT FOR HEATING POLAR POLYMERS TO THE TEMPERATURE AT WHICH THEY BECOME PLASTIC

BACKGROUND OF THE INVENTION

The present invention relates to equipment for heating polar polymers to the temperature at which they become plastic, by making use of the interaction between the electric dipole moment of the polymers and the electromagnetic field associated with a microwave.

Microwaves, that is to say electromagnetic waves of which the wavelengths are between those of radio waves and those of infra-red waves have already been used, with a certain amount of success, to heat various materials.

Thus, microwave ovens have already been proposed especially for reheating and cooking food. Since the wavelength of these microwaves is of the order of a centimeter, these radiations can be guided through tubular waveguides and can form stationary waves in closed or semi-closed cavities such as ovens.

More recently, tunnel ovens have also been developed and these are successfully used for drying or gelling aqueous dispersions or the like of a polar plastic material deposited on temporary or final supports.

The use of these waves as a means for heating polar materials in fact possesses some advantages compared with the radiations of less high frequencies widely used hitherto.

Thus, the absorption of energy by the treated material is higher, since this absorption is a function of the reciprocal wavelength. Moreover the electrodes need not be located in the heating zone.

Microwaves thus form a very valuable means of heating and their use in customary pieces of equipment for processing polymers, such as, for example, extruders and other plasticising or gelling devices, is highly desirable.

However, the use of microwaves as a means for heating has never been exploited hitherto in conventional pieces of equipment, probably due to the fact that specialists have considered that the presence of screws in these pieces of equipment excluded any possibility of making use of these radiations.

Moreover, microwaves have never been exploited either for processing polymers in equipment specially designed for this purpose. In fact, a very important phenomenon must be taken into consideration when the heating of certain polar polymers, such, as, for example, vinyl polymers, by means of electromagnetic radiation is considered. It has been found, that in many cases, the capacity of these materials for absorbing energy increases with their temperature. The result of this is that if, for any reason whatsoever, the initial temperature of these products is heterogeneous, the absorption of energy is most intense at the hottest points. This results in preferential heating of the hot points and, taking into account the low thermal conductivity of these materials, rapidly leads to degradation, especially when the material is heat-sensitive.

Moreover, since it is not possible, when a microwave is travelling through a waveguide, to achieve a constant energy distribution at every point throughout the cross-section of the waveguide, if the material to be heated travels at a constant speed through the waveguide, this inevitably leads to preferential localised overheating effects which are amplified and present the danger of degrading the treated material.

Thus it is generally found that, when a polar polymer is passed at a constant linear speed through a rectilinear waveguide of circular cross-section supplied by a microwave generator and having given dimensions so that only the mode of longest wavelength can propagate, the central part of the flow has a tendency to become hotter than the periphery and this difference increases very rapidly as soon as it is triggered.

These phenomena are obviously extremely objectionable when the use of microwaves is considered for heating a polar polymer by making it travel through a waveguide.

SUMMARY OF THE INVENTION

The Applicant Company has now developed equipment which makes it possible to heat a polar polymer homogeneously by means of microwaves as the polymer travels through a waveguide.

The present invention thus relates to equipment for heating polar polymers to the temperature at which they become plastic, characterised in that it comprises a microwave generator, a tubular component acting as a waveguide in conjunction with the generator, means for supplying the tubular component with polar polymer and for causing the latter to travel through the tubular component, and at least one static malaxating device positioned inside the tubular component.

The microwave generator is preferably of the magnetron or klystron type. It is very obvious that, if desired, it is possible to use several connected generators at points spaced along the tubular component. In this case, each element in the line is insulated from the preceding element on the one hand and from the following element on the other hand by means of a device of the type of a plate with wide holes or a wave reflecting device. The microwave emitted by this generator or these generators is preferably polarised. The frequency is generally between $10^9$ and $10^{11}$ cycles/second.

The tubular component acting as a waveguide is preferably rectilinear and of constant circular cross-section. It comprises of a tube made from a material which conducts electricity, and preferably from metal. Its geometry is chosen so that only the $TE_{11}$ mode, of which the component of the electric field along the direction of propagation of the wave is zero, can propagate across the field. In order to make calculations about the waveguide, reference can usefully be made to the works "Waveguide Handbood" edited by N. MARCUVITZ - Mc GRAWHILL BOOK CC LTD, 1951 and "Microwave Transmission Circuits" edited by G.L. RAGAN-DOVER PUBLICATIONS INC., 1965.

The means for supplying the tubular component with polar polymr and for causing the latter to travel through the tubular component acting as a waveguide can be any means whatsover. Thus, for this purpose, it is possible to use a feed system employing a screw or a piston ram connected to a feed hopper. This feed system can advantageously be provided with conventional heating means for the purpose of starting to heat the polar polymers from this stage of their treatment onwards.

In order to avoid heterogeneous and consequently defective heating of the polar polymer as it travels through the tubular component, the material is malaxated by means of a fixed mechanical system which does not disturb the electromagnetic field associated with the microwave.

In the equipment according to the invention, this malaxating effect is produced by means of at least one static malaxating device including of a thin elongated partition which divides the tubular component diametrically into two separate channels. This partition advantageously has the shape of a helicoidal surface, the generatrices of which are diameters of cross-sections of the tubular component. In other words, these static devices have the shape of a helicoidal surface generated by the simultaneous translation and rotation of a diameter of the waveguide tubular component resting on the axis of the tubular component.

The particular profile of this partition and its length are chosen so as to cause the flow of material to reverse its direction. The material which is against the wall of the tubular component acting as a waveguide at the inlet of the malaxating device travels towards the centre and then returns to the wall.

When the polarised wave which is propagated, according to the $TE_{11}$ mode, through the tubular component encounters a static malaxating device, that is to say a metal partition which separates the waveguide into two equal parts, two situations can arise, as extreme cases.

In a first case, the lines of force of the electric field are orthogonal to the partition and the lines of force of the magnetic field are tangential. In this case, the conditions at the propagation limits of the fields are always fulfilled and the wave can propagate without any great perturbation and without attenuation. The only effect of the static malaxating device is to turn the plane of polarisation of the wave according to the profile of the helicoid. Thus, when this device possesses an angle of rotation of 180°, the plane of polarisation of the wave also turns through 180°. It is however, advisable to determine the pitch of the helicoid so as to prevent the appearance of a reflected component.

In the second case, the lines of force of the electric field are tangential to the partition and the lines of force of the magnetic field are orthogonal. In this case, the wave can no longer propagate because there are no field components which correspond to the limiting conditions.

It is consequently advisable to choose the plane of polarisation of the wave correctly, so that the wave is in the most favourable condition for its propagation through the static malaxating device (first case mentioned), and to determine experimentally the pitch of the helix which is the most favourable.

In order to obtain a more intense malaxating effect and consequently to produce more homogeneous gelling or plasticising, it is often advantageous to use several static malaxating devices arranged in series and spaced slightly apart from one another. In this case, it is preferable to arrange the successive static malaxating devices in such a way that the partition at the inlet of each successive device is positioned at an angle of 90° relative to the partition at the outlet of the preceding device.

Moreover, it is advantageous, in this case, that the partitions of successive devices should describe helicoids of opposite-handed pitch.

By respecting these various conditions, the material treated is forced to undergo successive operations of flow division, reversal of the direction of flow and reversal of the flow, which contribute effectively towards boosting the malaxating effect.

However, since in this particular case the static malaxating devices are staggered by 90°, the polarised wave which propagates correctly through one device cannot continue its path through the following device, since there are no field components which correspond to the limiting conditions. In order that this wave can overcome this obstacle, it is thus important that its plane of polarisation should be rotated through 90° before the wave enters the following device. In order to achieve this result, it is consequently advisable to insert, between successive malaxating devices, elements which can cause the plane of polarisation of the wave to be rotated in this way.

According to a preferential embodiment, these elements comprise of flat deflectors in the shape of a rightangled triangle of which one of the sides of the right angle is adjacent to and extends one of the ends of one of the malaxating devices and the other side rests on the internal wall of the tubular component.

In this way, the polarised wave which encounters these triangular surfaces is split gradually into two components of opposite phases, the planes of polarisation of which have rotated respectively through + and − 90°. As a result of this, the wave can now propagate through the subsequent static malaxating device. In general, it is preferred that the even-numbered static malaxating devices, starting from the inlet, should each be equipped with a triangular flat partition at both their ends.

The length of the base of these triangular deflectors must be determined experimentally in order to restrict wave reflection on these surfaces to the maximum extent.

It is also advisable to insulate the useful part of the waveguide tubular component electrically by providing at its ends insulating partitions, such as metal plates possessing wide holes which allow the material to be treated to pass easily and form a plane of reflection for the microwave.

The outlet of the tubular component can moreover be equipped with a profiling head for the plasticised polymer, such as a round or flat die, so as to make it possible directly to produce hollow or solid shaped articles of any cross-section whatsoever. This profiling head is positioned after the insulating partition which provides electrical insulation of the tubular component.

According to a preferential embodiment, a malaxating screw can advantageously precede the profiling head, for example having an arrangement such that this screw is at 90° relative to the tubular component. This screw is thus inserted between the end insulating partition of the waveguide tubular component and the profiling head. The function of this screw is especially to effect malaxating so as to complete the process of making the temperature of the treated material uniform. Moreover, profitable use can be made of this section of the equipment for effecting degassing of the gelled plastic. Finally, this screw can provide the pressure energy necessary for the final shaping of the material by means of the profiling head and can thus reduce the work done by the feed device provided upstream from the waveguide tubular component.

DESCRIPTION OF THE PREFERRED EMBODIMENTS

Figure 1:
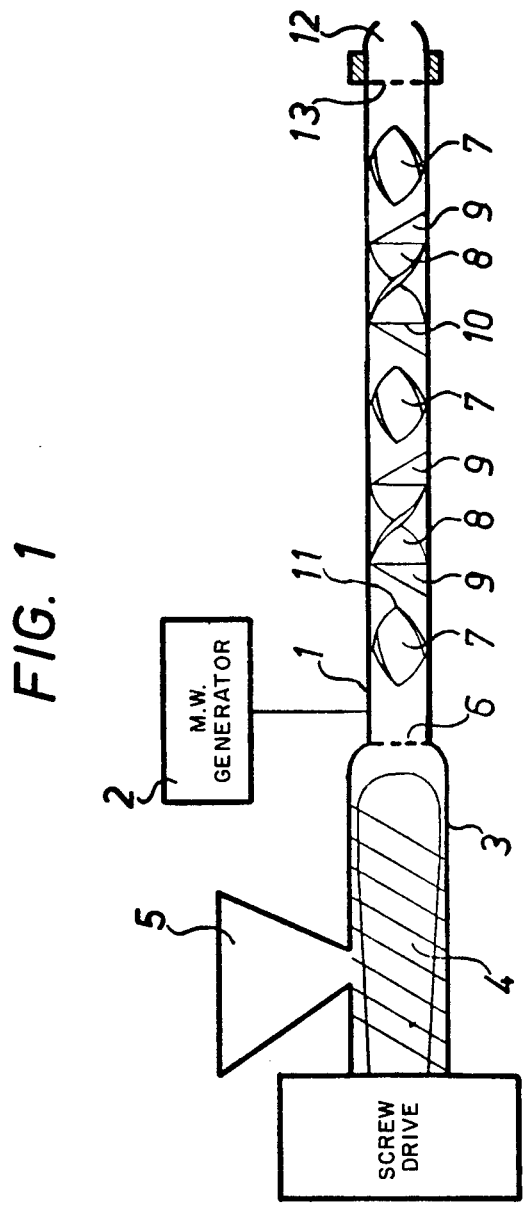
FIG. 1 is a diagrammatic cross-sectional view of one embodiment of the present invention.

As is apparent in these figures which are given purely by way of illustration, the essential element of the gelling device according to the invention comprises of the tubular component which acts as a waveguide 1 and which is used in conjunction with an industrial microwave generator 2. All of those elements of FIG. 2 which are the same as elements of FIG. 1 are provided with the same reference numeral with a prime.

In FIG. 1 there is shown a feed device 3 which employs a screw 4 and is equipped with a feed hopper 5 is connected to the waveguide tubular component 1 via a plate possessing wide holes 6 which insulates the waveguide electrically.

The useful part of the waveguide is equipped internally with a series of static malaxating devices 7 and 8 which are spaced apart from one another. The devices comprise an elongated partition which divides the tubular component diametrically into two separate channels. The partition describes a helicoid, the angle of rotation of which is 180° between the inlet and the outlet. It is seen, moreover, that the partition at the inlet 10 of each static device is positioned at 90°, relative to the partition at the outlet "of the preceding device". Finally, each end of the even-numbered devices 8 is equipped with a triangular flat deflector 9, the function of which is to rotate the plane of polarisation of the microwave emitted by the generator through 90°.

The end of the tubular component of FIG. 1 is equipped with a die 12 which is insulated electrically from this component by means of a plate possessing wide holes 13.

The device of FIG. 1 thus described functions in the following way. The polar polymer, which is preferably preheated and mixed with its additives in a high-speed mixer which is not represented, is introduced into the hopper 5 and is forced by the screw 4 through the waveguide tubular component. As it travels through the waveguide, the material is heated by the microwave emitted by the generator 2 and is malaxated vigorously by means of the static malaxating devices 7 and 8. The material, plasticised or gelled homogeneously in this way, is shaped by passing through the die 12.

Figure 2:
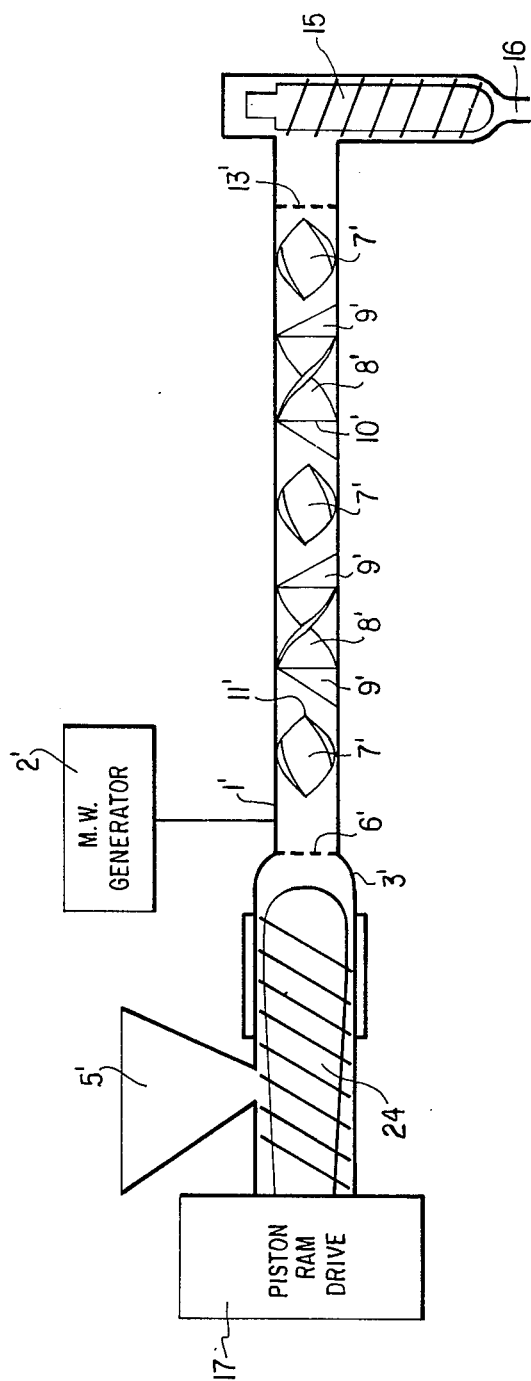
FIG. 2 is a diagrammatic cross-sectional view of another embodiment of the invention.

The embodiment of FIG. 2 is similar to FIG. 1 except that instead of a screw drive, a piston ram drive 17 is provided for driving position 24. The remainder of the apparatus operates in the same manner as the device of FIG. 1 except that the end of the tubular component is equipped with a die or profiling head 16 which is preceded by a malaxating screw 15 arranged to be at a 90° angle relative to the tubular component. The screw is to effect malaxating so as to complete the process of making the temperature of the treated material uniform, can be used to effect degassing of the gelled plastic, and can provide the pressure energy necessary for the final shaping of the material by means of the profiling head.

It will be understood that the above description of the present invention is susceptible to various modifications, changes and adaptations, and the same are intended to be comprehended within the meaning and range of equivalents of the appended claims.

I claim:

1. Equipment for heating polar polymers to the temperature at which they become plastic, characterised in that it comprises a microwave generator, a tubular component acting as a waveguide in conjunction with the generator, means for supplying the tubular component with the polar polymer and for causing the latter to travel through the tubular component, and at least one static malaxating device positioned inside the tubular component for malaxating the polar polymer which prevents uneven heating thereof without significant pertubation of the microwaves.

2. Equipment according to claim 1, characterised in that the tubular component is of circular cross-section and the malaxating device includes of a partition which divides the tubular component into two separate channels and which has the shape of a helicoidal surface, the generatrices of which are diameters of cross-sections of the tubular component.

3. Equipment according to claim 2, characterised in that it possesses several static malaxating devices spaced apart from one another and arranged in series, the partition at the inlet of each device being positioned so as to make an angle of 90°, relative to the partition at the outlet of the preceding device.

4. Equipment according to claim 3, characterised in that the successive static malaxating devices have the shape of helicoidal surfaces of alternately opposite-handed pitch.

5. Equipment according to claim 2, characterised in that some static malaxating devices are extended by deflectors which rotate the plane of polarisation of the microwave through 90°.

6. Equipment according to claim 5, characterised in that the deflectors which rotate the plane of polarisation of the microwave through 90° include of flat partitions in the shape of a right-angled triangle of which one of the sides of the right angle is adjacent to one of the ends of one of the static malaxating devices and the other side rests on the internal wall of the tubular component.

7. Equipment according to claim 1, characterised in that the means for supplying the tubular component includes a screw system.

8. Equipment according to claim 1, characterised in that the means for supplying the tubular component includes a piston ram feed system.

9. Equipment according to claim 1, characterised in that the downstream end of the tubular component is equipped with a profiling head.

10. Equipment according to claim 9, characterised in that it also possesses a malaxating screw positioned upstream from the profiling head for providing the pressure energy necessary for the final shaping of the material by the profiling head.

11. Equipment according to claim 1, characterised in that the ends of the tubular component possess insulating partitions which allow the polymer to pass and form a plane of reflection for the microwave.

12. Equipment according to claim 11, characterised in that the insulating partitions are metal plates possessing wide holes.

13. Equipment as defined in claim 1 comprising means for assuring travel of the microwaves through the length of the tubular component in which the polar polymer is to be heated.

* * * * *